Figure 1:
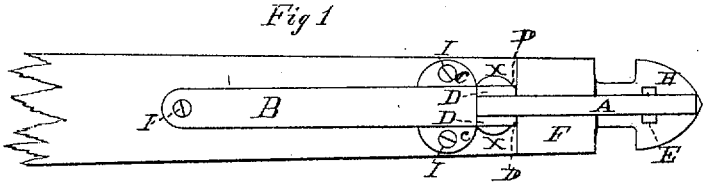

C. W. SALADEE.

Whiffletree Snap-Hooks.

No. 5,399. Reissued May 6, 1873.

Attest:

Jno. D. Patten

John Williams

Inventor:

Chas. W. Saladee

AM. PHOTO-LITHOGRAPHIC CO. N.Y. (OSBORNE'S PROCESS.)

UNITED STATES PATENT OFFICE.

CYRUS W. SALADEE, OF PITTSBURG, PENNSYLVANIA.

IMPROVEMENT IN WHIFFLETREE SNAP-HOOKS.

Specification forming part of Letters Patent No. 51,089, dated November 21, 1865; reissue No. 5,399, dated May 6, 1873; application filed April 28, 1873.

*To all whom it may concern:*

Be it known that I, CYRUS W. SALADEE, of Pittsburg, in the State of Pennsylvania, have invented certain Improvements in Snap-Hooks for Whiffletrees, of which the following is a specification embodying my invention.

*Nature and Object.*

The nature of my invention consists in the employment of a snap-hook actuated by a concealed spring, and combined with the trace-hook of the ends of the whiffletree upon the plan of either of the modifications shown in the drawing, and as hereinafter described and claimed; and has for its object the secure and positive retention of the trace-end in its position upon the trace-hook when in use, and thus the more effectually to prevent accidents occurring from the trace becoming detached than has heretofore been done.

*The Drawing.*

Figure 2:
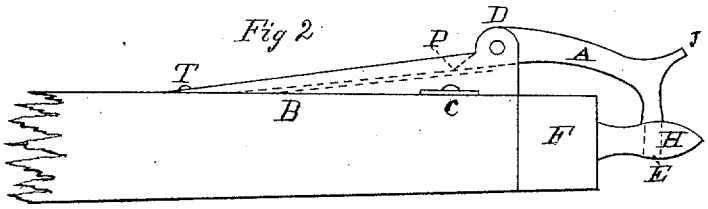
Figure 3:
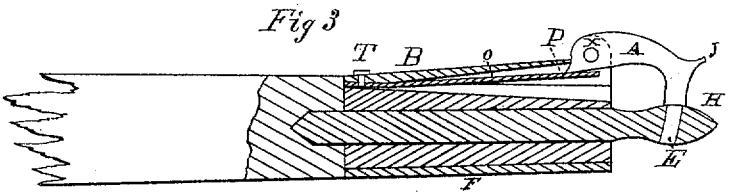
Figure 4:
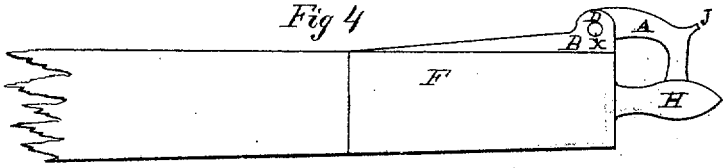

In the drawing, Figure 1 is a top view of the end of a whiffletree; and Fig. 2 is a side view, representing the first modification of my improvement attached in position upon the end of the whiffletree, and with the snap-hook in connection with the trace-hook. Fig. 3 is a side elevation, in section, representing the second modification of my invention attached in position upon the end of the long ferrule or socket by which the attachment of the snap-hook is made to the end of the whiffletree. Fig. 4 is a side elevation, representing the third modification of my invention, wherein are shown both the snap-hook and the trace-hook secured upon the end of the long ferrule or socket seen in Fig. 3, and by which the whole is secured to the ends of the whiffletree.

*References to the Drawing.*

A is the snap-hook; B, the plate holding the snap-hook and its spring in the first modification; C, ears of the plate B; D, the raised ears between which the rear end of the snap-hook is secured and operated; E, the hole or slot in the end of the trace-hook to receive the point of the snap-hook A; F, the ferrule or socket on the end of the whiffletree; H, the trace-hook; I, the wood-screws used in the first modification; O, the spring actuating the snap-hook A; P, the bearing on the rear end of the snap-hook against which acts the spring. X is the pintle or rivet holding the snap-hook between the raised ears D; and J is the thumb-hold formed upon the front end of the snap-hook A, by which to raise it out of its position in the hole E of the trace-hook H.

Before entering upon a general description of my invention I will here state that I do not claim trace-fasteners having springs exposed to mud and dust; neither do I claim a snap-hook on the ends of whiffletrees that are formed in the fashion of a lever, as when the body of the hook extends back and above the pintle X, the rear part serving as a thumb-bearing by which to raise the front end of the hook, such devices being old and well known.

*General Description.*

In the first modification, shown in the drawing by Figs. 1 and 2, the snap-hook A and the spring O are secured and operated upon and within the hollow plate B, by which the attachment is made to the wood of the whiffletree, independent of the ferrule F, by means of the wood-screws I I I. The spring actuating the snap-hook is concealed beneath the plate B so as to protect it against mud, sand, &c., and the point of the snap-hook is made to rest in the hole or slot E of the trace-hook H when the trace is in position, and thereby make this connection secure.

In the second modification, shown in Fig. 3, the snap-hook A and the spring O are secured to the long ferrule or socket F in place of the independent plate B, as seen in Figs. 1 and 2, and, by means of the ferrule or socket F, the hook and spring are secured to the ends of the whiffletree, while the trace-hook H is driven into the end of the wood of the whiffletree, as in the first modification. Here, also, the spring actuating the snap-hook is concealed within the ferrule or socket F for a purpose like that mentioned in the first modification.

In the third modification, seen in Fig. 4, the snap-hook and and its spring, as well as the trace-hook H, are connected to the long ferrule or socket F, seen in Fig. 3, as a part of the same, and the whole is secured to the ends of the whiffletree by means of the ferrule or socket F, as clearly shown in drawing.

The size and proportion of the separate parts shown and described as related to each other will be readily understood by those skilled in the art of manufacture, and as well as the variety of styles of which the same is susceptible will have to be determined according to the fancy and judgment of the manufacturer.

*Claims.*

I claim as my invention—

1. The snap-hook A, constructed to operate in connection with a concealed spring and the trace-hook H, substantially as and for the purpose set forth.

2. The spring to actuate the snap-hook A, concealed within the plate B or ferrule F, substantially as and for the purpose set forth.

3. The snap-hook A, when provided with thumb-hold J, in combination with the ferrule or socket F and trace-hook H, Fig. 4, substantially as and for the purpose set forth.

Witnesses: CYRUS W. SALADEE.
FRANCIS TORRANCE,
N. B. HATCH.